(12) United States Patent
Guan

(10) Patent No.: US 6,998,782 B1
(45) Date of Patent: Feb. 14, 2006

(54) CIRCUIT FOR GENERATING A PROCESS-INDEPENDENT CURRENT

(75) Inventor: Charles Guan, San Francisco, CA (US)

(73) Assignee: National Semiconductor Corporation, Santa Clara, CA (US)

(*) Notice: Subject to any disclaimer, the term of this patent is extended or adjusted under 35 U.S.C. 154(b) by 0 days.

(21) Appl. No.: 10/921,499

(22) Filed: Aug. 18, 2004

(51) Int. Cl.
*H01J 23/16* (2006.01)
*H04N 5/68* (2006.01)
*H04N 17/00* (2006.01)

(52) U.S. Cl. ................... 315/3; 348/180; 348/380
(58) Field of Classification Search .............. 315/3, 315/411, 291, 307; 348/180, 181, 380; 324/404; H01J 23/16; H04N 5/68, 17/00
See application file for complete search history.

(56) References Cited

U.S. PATENT DOCUMENTS

| | | | | |
|---|---|---|---|---|
| 4,059,793 A | * | 11/1977 | Ahmed | ................... 323/313 |
| 5,049,834 A | * | 9/1991 | Kasai | ................... 330/255 |
| 5,390,068 A | * | 2/1995 | Schultz et al. | ............. 361/95 |
| 5,734,703 A | * | 3/1998 | Hiyoshi | ................ 379/93.28 |
| 5,757,233 A | * | 5/1998 | Kato et al. | ................ 330/254 |
| 5,889,557 A | * | 3/1999 | Sato | ........................ 348/380 |
| 6,294,876 B1 | * | 9/2001 | Ando et al. | ............ 315/169.1 |
| 6,686,710 B1 | | 2/2004 | Guan et al. | ............... 315/381 |

\* cited by examiner

*Primary Examiner*—Thuy Vinh Tran
(74) *Attorney, Agent, or Firm*—Darby & Darby PC; Matthew M. Gaffney

(57) ABSTRACT

Based, in part, on an input video signal, an autobias circuit generates red, green, and blue channel video signals, which are received by external drivers to drive cathodes in a CRT. The autobias circuit also provides gain and bias control signals based on a sense current. The external drivers generate the sense current such that the sense current is proportional to the sum of the beam currents flowing from the cathodes. The sense current has an error caused by current flowing through external recharge resistors. A correction current (Ivideo) is subtracted from the sense current to compensate. The correction current is generated according to the equation Ivideo=(Vs/Rkin)*[(Vref/Rext)/(Vref/Rin)], where Vkin and Rin are matched internal monolithic resistors, Rext is the resistance of another external resistor that is matched to the external recharge resistors, and Vs is the sum of the red, green, and blue channel video signals.

20 Claims, 13 Drawing Sheets

CIRCUIT FOR GENERATING A PROCESS-INDEPENDENT CURRENT

FIELD OF THE INVENTION

The invention is related to current compensation, and in particular, to a circuit for generating a current for correcting a sense current that is employed to measure beam current in a cathode ray tube (CRT) display.

BACKGROUND OF THE INVENTION

A conventional cathode ray tube (CRT) creates an image on a phosphor coated display screen by focusing a beam of electrons onto the screen and thus making the phosphors emit visible light. The electron beam is typically formed by first causing a cathode inside the vacuum of the CRT to emit electrons by applying a differential voltage between the cathode and a grid. The CRT has one or more anodes to attract, focus, and accelerate the electrons. Thus, the anodes may collimate the electrons into a tight beam hitting a spot of the display screen. By creating currents in coils outside the CRT, a magnetic field is created within the CRT to direct the electron beam at any desired spot of the display screen.

As the phosphors in a CRT respond to the intensity of the beam current, the brightness of the picture will be a function of the beam current. However, the beam current does not stay constant for a given cathode voltage over its lifetime. Hence, the picture intensity will typically change even though the same voltage is applied to the cathode.

BRIEF DESCRIPTION OF THE DRAWINGS

Non-limiting and non-exhaustive embodiments of the present invention are described with reference to the following drawings, in which.

DETAILED DESCRIPTION

Figure 1:
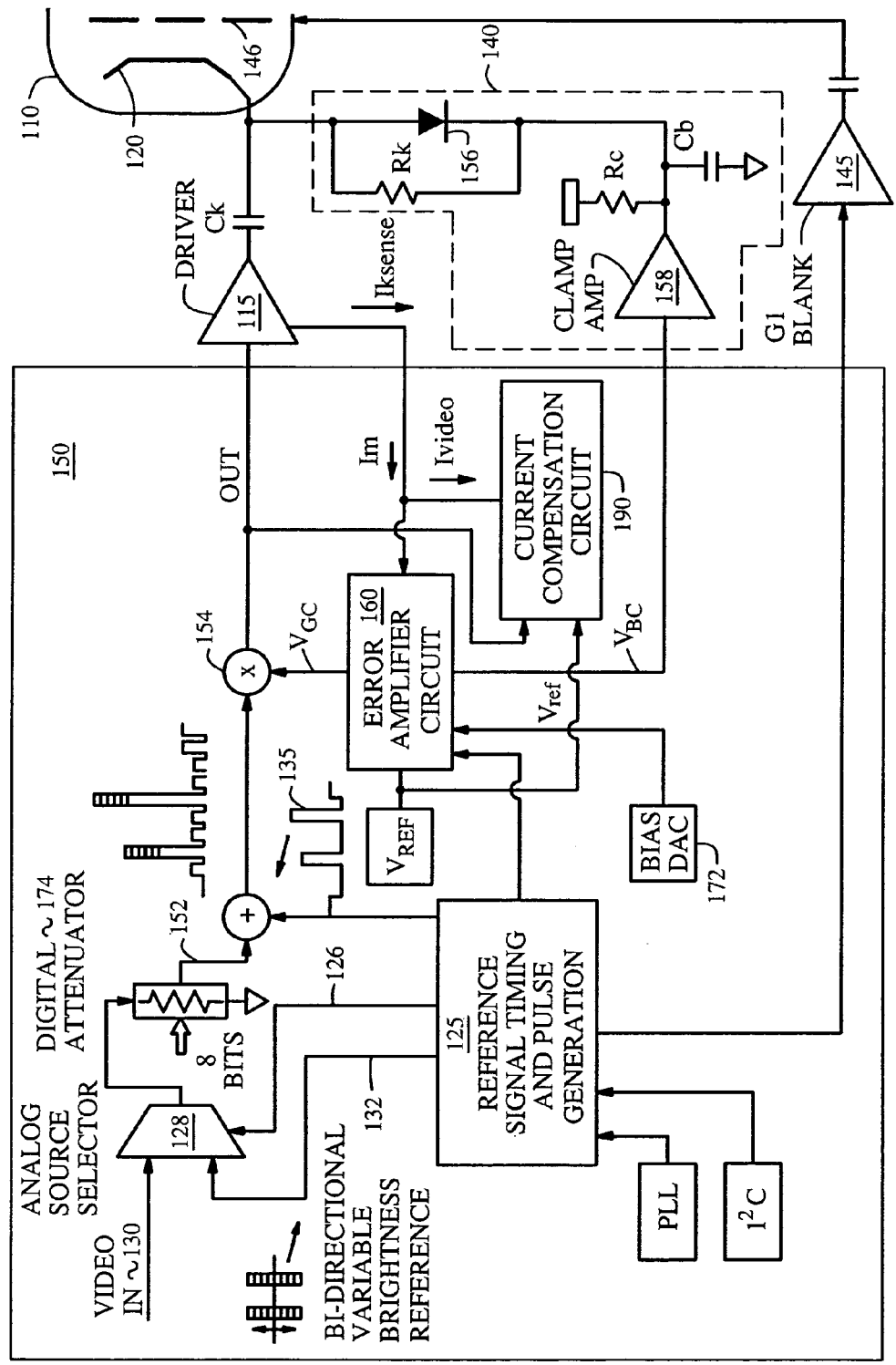
FIG. 1 shows a block diagram of an embodiment of a system for regulating current in a cathode ray tube.

Various embodiments of the present invention will be described in detail with reference to the drawings, where like reference numerals represent like parts and assemblies throughout the several views. Reference to various embodiments does not limit the scope of the invention, which is limited only by the scope of the claims attached hereto. Additionally, any examples set forth in this specification are not intended to be limiting and merely set forth some of the many possible embodiments for the claimed invention.

Throughout the specification and claims, the following terms take at least the meanings explicitly associated herein, unless the context dictates otherwise. The meanings identified below are not intended to limit the terms, but merely provide illustrative examples for the terms. The meaning of "a," "an," and "the" includes plural reference, and the meaning of "in" includes "in" and "on." The phrase "in one embodiment," as used herein does not necessarily refer to the same embodiment, although it may. The term "coupled" means at least either a direct electrical connection between the items connected, or an indirect connection through one or more passive or active intermediary devices. The term "circuit" means at least either a single component or a multiplicity of components, either active and/or passive, that are coupled together to provide a desired function. The term "signal" means at least one current, voltage, charge, temperature, data, or other signal.

Briefly stated, the invention is related to a circuit for current compensation. Based, in part, on an input video signal, an autobias circuit generates red, green, and blue channel video signals, which are received by external drivers to drive cathodes in a cathode ray tube (CRT) display. The autobias circuit also provides gain and bias control signals based on a sense current. The external drivers generate the sense current such that the sense current proportional to the sum of the beam current flowing from three of the cathodes. The sense current has an error caused by current flowing through external recharge resistors. A correction current (Ivideo) is subtracted from the sense current to compensate for the error. The correction current is generated according to the equation Ivideo=(Vs/Rkin)*[(Vref/Rext)/(Vref/Rin)], where Rkin and Rin are the resistances of matched internal monolithic resistors, Rext is the resistance of another external resistor that is matched to the external recharge resistors, and Vs is the sum of the red, green, and blue channel video signals.

One embodiment of the present invention employs an embodiment of a current compensation circuit to obtain an accurate biasing of a CRT by using an autobias system to regulate the beam current. The autobias system may be a closed loop system, responding to variations in the system under feedback control to regulate the beam current. By inserting low and a high test level pulses, the resulting cathode currents can be measured and compared to pre-determined desired currents to control the beam current. Other embodiments of the invention may be used employed to provide a process-independent current for applications other than autobias applications.

The first several sections of this paper describe an embodiment of an autobias system that employs an embodiment of a current compensation circuit. The section entitled "Embodiment of a circuit for providing a process-independent circuit" describes an embodiment of a circuit for providing a process-independent circuit, which may be used for autobias applications, and may be used for other applications as well. The section entitled "Embodiment of a current compensation circuit" describes an embodiment of a current compensation circuit that may employed in an autobias system.

OVERVIEW OF AN EMBODIMENT OF AN AUTOBIAS SYSTEM FOR A CRT

FIG. 1 illustrates a system for regulating current in a cathode of a CRT 110. The chip 150 outputs video signal OUT to a gain amplifier 115 that is coupled to a cathode 120 of the CRT 110. The chip 150 periodically tests the cathode 120 by outputting a test signal 135 comprising a number of pulses of variable magnitude. Error amplifier circuit 160 is configured to measure the response to the test signal 135 and output compensation signals $V_{GC}$ and $V_{BC}$.

When testing the cathode 120, the test signal timing and pulse generation logic 125 may output a signal 126 to a MUX 128 to select a bidirectional variable brightness test signal 132, which is combined with the test signal 135. When not under test a video in signal 130 may be selected.

A clamping circuit 140 coupled to the cathode 120 may provide a DC bias signal thereto. A blanking amplifier 145 may be coupled to a grid 146 of the CRT 110 to provide a blanking signal. The simplified system only shows one cathode 120 and associated gain driver 115 and clamping circuit 140. However, in one embodiment, the system may comprise a plurality of channels (e.g., red, blue, and green) each with its own cathode 120, gain driver 115, and clamping circuit 140. In this embodiment, signal OUT includes red channel video signal $V_R$, green channel video signal $V_G$, and blue channel video signal $V_B$.

The autobias system may be AC coupled. However, embodiments of the present invention are not so limited. Each gain driver 115 (only one driver shown) may have a current source output, which may be summed together. In this fashion a current ($I_{ksense}$) that may be proportional to the sum of the beam currents flowing from the three cathodes 120 of the CRT 110 may be input to the chip 150. The $I_{ksense}$ input may act as a constant voltage source and maintain a constant voltage at the output pin within the normal range of the beam current.

Error amplifier circuit 160 in the chip 150 may generate two control signals (e.g., voltages), $V_{GC}$ and $V_{BC}$ by measuring the beam current that results from various amplitude drive pulses of the test signal 135 and superimposed on the video signal 152 to the gain driver(s) 115. The gain control voltage, $V_{GC}$ may control the gain of the active video signal through a voltage controlled amplifier 154, in order to maintain the beam current at a constant predetermined level during a high level test drive pulse. The bias control voltage $V_{BC}$ may control the DC offset of the signal fed to the clamp circuit 140 in order to maintain the beam current at constant predetermined level during a low level test drive pulse.

Voltage reference circuit $V_{REF}$ is arranged to provide voltage Vref to error amplifier circuit 160 and current compensation circuit 190 such that voltage Vref is substantially independent of temperature and process. In one embodiment, voltage reference circuit $V_{REF}$ is a bandgap reference circuit.

A function of the autobias system is to allow accurate determination of the beam current in the presence of factors that may generate appreciable error. There may be two main contributors that cause error in the measurement. One main contributor is leakage and bias currents in the gain driver(s) 115. The other is charge currents that flow through the resistor Rk in parallel with the clamp diode 156. The current that flows in resistor Rk is employed to charge the coupling capacitor at start up and when the DC bias is changed. This current may be comparable in magnitude to the beam current. Embodiments of the present invention subtract these currents from the measured $I_{ksense}$ in order to allow accurate operation of the autobias system.

The autobias system is a closed loop system, responding to variations in the system under feedback control to regulate the beam current. To allow stable operation, error amplifier circuit 160 is configured to provide appropriate frequency compensation to the loop transfer characteristics. One consideration to setting this compensation is that the AC coupling capacitors in the output cathode drive form a relatively low frequency roll off in the bias control system. This cutoff frequency varies with the image loading. The bias control amplifiers (e.g., clamping amplifiers 158) can quickly discharge the coupling capacitors through the clamp diode 156, but recharging can take much longer, as this may be facilitated through either beam current or through the charging resistor, Rk. Another consideration is that the maximum frequency within the loop may be governed by the sampling nature of the $I_{ksense}$ sampling system, which may operate by sampling the beam current during the blanking period at vertical refresh frequency.

Current compensation circuit 190 is arranged to provide current Ivideo such that current Ivideo is substantially equal to the sum of the currents through each of the Rk resistors. In an embodiment in which there are three clamping circuits 140 and thus three Rk resistors, Ivideo is substantially equal to the sum of the current through each of the three Rk resistors. In an embodiment in which there is only one Rk resistor, current Ivideo is substantially equal to the current through the one Rk resistor. Current compensation circuit 190 is arranged to provide current Ivideo such that current Ivideo is substantially independent of process, even though it may employ monolithic resistors to provide current Ivideo. Current compensation circuit 190 provide signal Ivideo based on signal OUT, signal Vref, and an external current Iext (not shown in FIG. 1). The generation of current Iext is explained in greater detail below. Briefly, however, current Iext may be provided from an external resistor Rext (not shown) that is matched with resistor Rk. Voltage Vref may be placed across external resistor Rext to provide current Iext.

Error amplifier circuit 160 is arranged to receive modified sense current Im such that current Im is substantially equal to Iksense−Ivideo, as explained in greater detail below.

Figure 2:
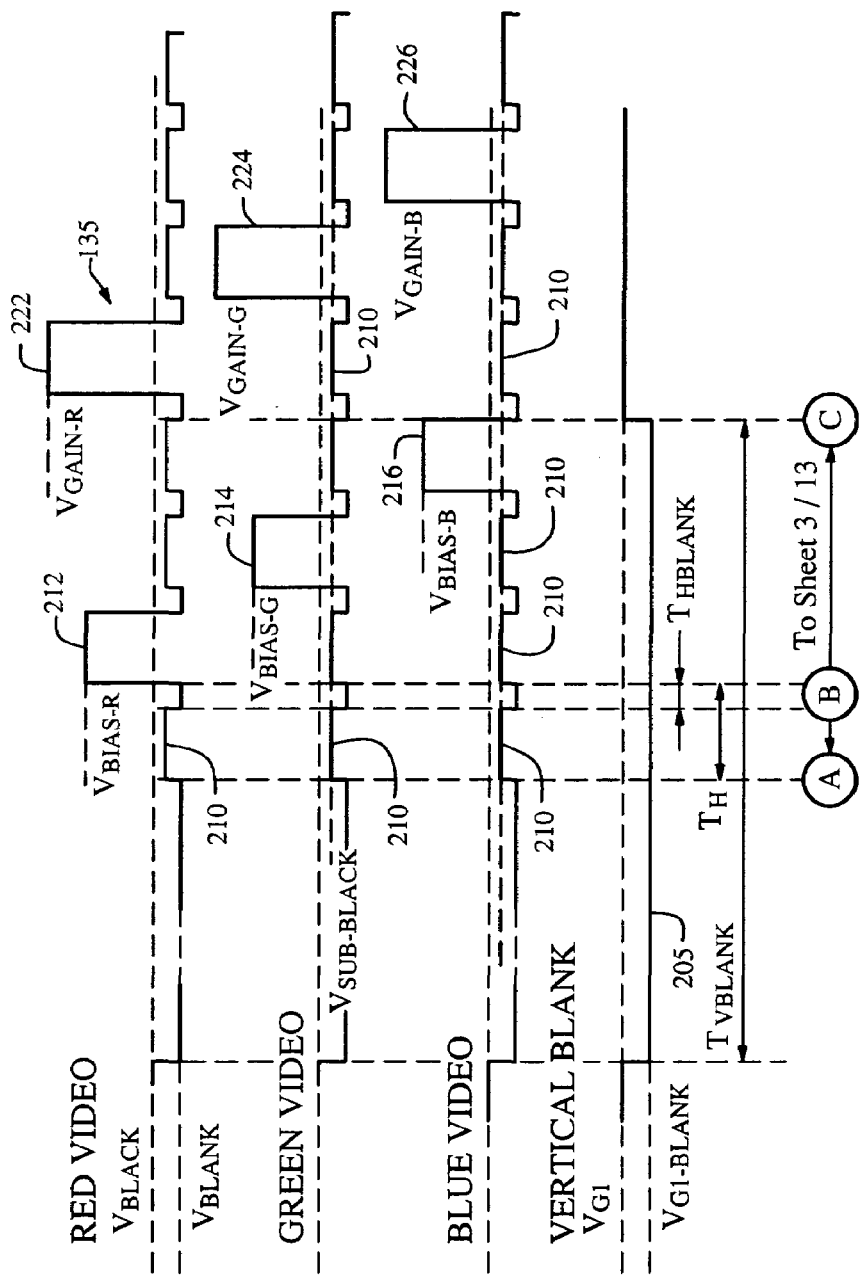
FIG. 2 illustrates a diagram of waveforms of embodiments of test timing signals.
Figure 2:
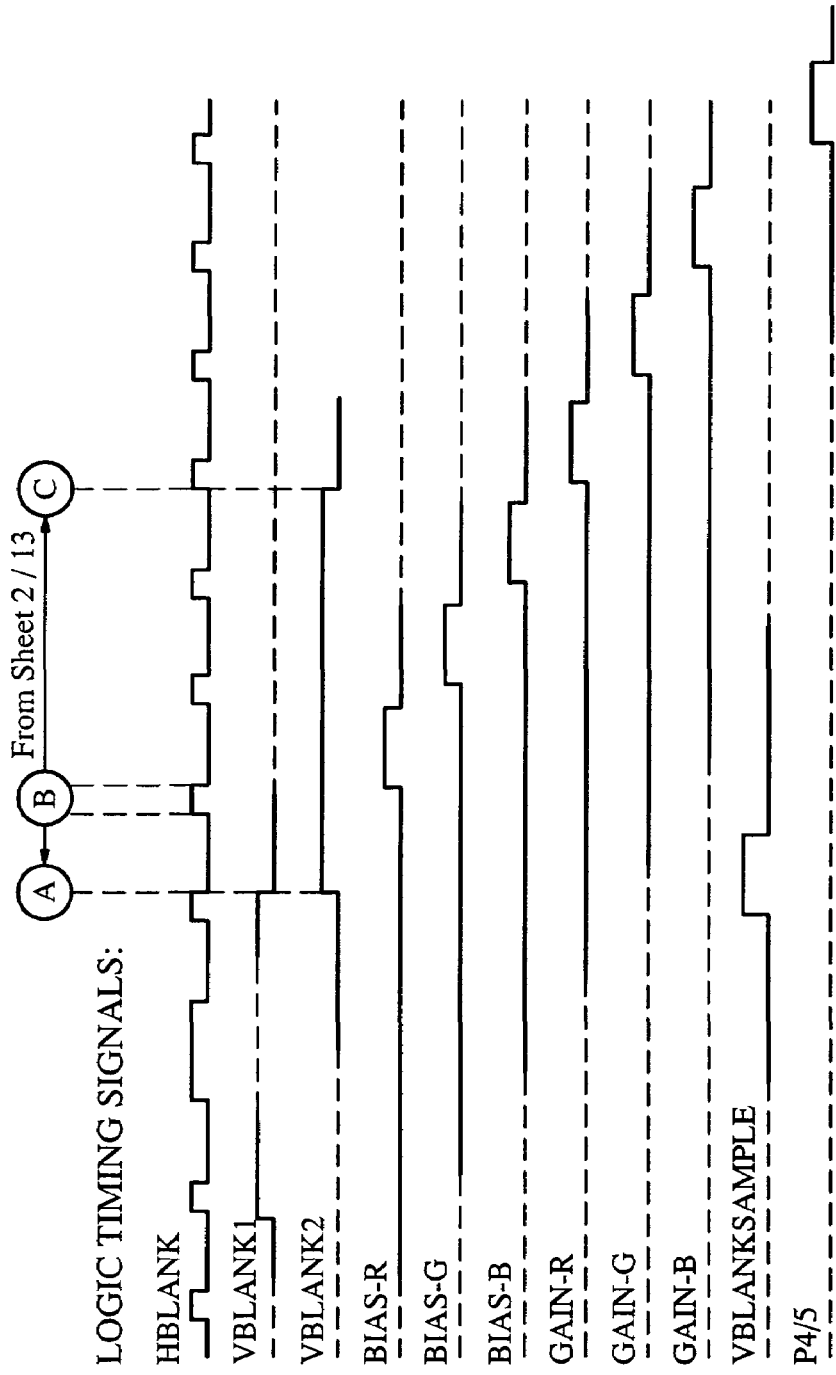

Referring now to FIG. 2, the test signal 135 may comprise three measurement intervals for each cathode. The main signal drives to the red, green, and blue inputs of the gain drivers and to the G1 blanking amplifier are shown in FIG. 2, as well as logic timing signals. The first measurement interval period may occur when the logic signal "$V_{blank-sample}$" is active. During the first measurement interval, a very low voltage signal may be input to all three (RGB) channels. In this fashion, a leakage and an offset current may be measured.

The second interval may span the periods during which the logic signals, "Bias-R", "Bias-G", and "Bias-B" are active. During the second interval, each of the three channels is stimulated in succession with a pulse of pre-determined magnitude to measure low-level beam currents.

The third interval may span the periods during which the logic signals, "Gain-R", "Gain-G", and "Gain-B" are active. During the third interval, each of the three channels is stimulated in succession with a pulse of pre-determined magnitude to measure high-level beam currents. The logic timing signals are created and fed to analog sections in the chip 150 for test pulse generation and for operation of sample and holds in error amplifier circuit 160, etc. The order in which the three intervals are performed is not critical.

Leakage and Offset Current Interval

Still referring to FIG. 2, a baseline measurement of the leakage and offset currents may first be made so that these errors can be eliminated from the $I_{ksense}$ feedback measurements. Embodiments of the present invention cause the beam current to be zero during this interval, so that only the baseline currents are measured. Zero beam current may be ensured by two means:

a) a negative vertical blanking pulse 205 may be applied to G1 (e.g., blanking amplifier 145, FIG. 1); and b) a small blacker than black signal 210 may be applied to the cathodes.

Note that the vertical blanking pulse 205 may be applied both before and after the first interval. For example, the period before the first interval may correspond to the normal vertical blanking interval. Thus, the first interval may correspond to the time following the vertical-blanking interval when the first line is being drawn on the CRT.

In one embodiment, the cathodes are driven as far into the black level as possible without causing the gain amplifier to go into upper level cutoff saturation, or beyond the clamp level. If the gain amplifier is driven into upper level cutoff saturation, then the active leakage and bias currents may fail to be accurately measured. As indicted by the test signals in FIG. 2, all three cathodes may be driven into the sub-black level simultaneously. Thus, the combined leakage and offset currents of all three channels may be measured simultaneously.

Low Level Drive Interval

A measurement of the low level beam currents may be made for each cathode in sequence on consecutive lines after the baseline current measurement, thus taking three lines to complete these measurements. As seen in FIG. 2, the vertical blank signal is at the level "$V_{G1\text{-}Bank}$," so the G1 voltage is still being driven negative with respect to the normal operation (e.g., $V_{G1}$). Thus, this embodiment measures the low-level beam current during an extension to the vertical-blanking interval. For example, the time "$T_{VBLANK}$" may be longer than a normal vertical blanking interval done without the test.

The cathode being measured may be driven with a pulse that is substantially equal in amplitude to the negative G1 blanking pulse plus the low-level test pulse. FIG. 2 shows this as $V_{BIAS\text{-}R}$ 212, $V_{BIAS\text{-}G}$ 214 or, $V_{BIAS\text{-}B}$ 216. The other two cathodes may be driven with the sub-black baseline level 210. In this way, the change in current of the $I_{ksense}$ feedback current can be made relative to zero beam current in the cathode not being tested.

The beam current may be dependent upon the differential voltage between G1 and the cathode of interest. The low level drive may be set to create a differential drive of, for example, 30 volts on the measured cathode. However, other differentials may be used. A reference current level (e.g., FIG. 4, $I_{BIAS}$) may be set to be substantially equal to this nominal beam current level which arises from such an application of a differential voltage with a nominal CRT.

High Level Drive Interval

A measurement of the high level beam currents may be made for each cathode in sequence on consecutive lines, thus taking three lines to complete these measurements. One embodiment allows the vertical blanking pulse to end before the measurements are made, as seen in FIG. 2. Also, the G1 voltage is allowed to stabilize at its normal value, including any charge time for any G1 de-coupling. The cathode being measured may be driven with the high-level test pulse ($V_{GAIN\text{-}R}$ 222, $V_{GAIN\text{-}G}$ 224, or $V_{GAIN\text{-}B}$ 226) and the other two cathodes may be driven with the sub-black baseline level 210.

It is possible that at high brightness settings, the two cathodes that are being driven to the sub-black level 210 may cause one or both of those cathodes to turn on, as the brightness bias increase may drop the cathode voltage into conduction. The contribution of the two nominally sub-black drive cathodes is small compared to the high current flowing in the cathode under measurement, but it may have the effect of causing a small drop in the peak drive at high brightness levels, in the order of a few percent. The high level drive (222, 224, 226) may be set to create a differential drive of 100 volts on the measured cathode with respect to G1. However, other voltages may be used. A reference current level (e.g., FIG. 4, $I_{GAIN}$) may be set to be substantially equal to this nominal beam current level which arises from such an application of a differential voltage with a nominal CRT.

$I_{KSENSE}$ Measurement

Figure 3:
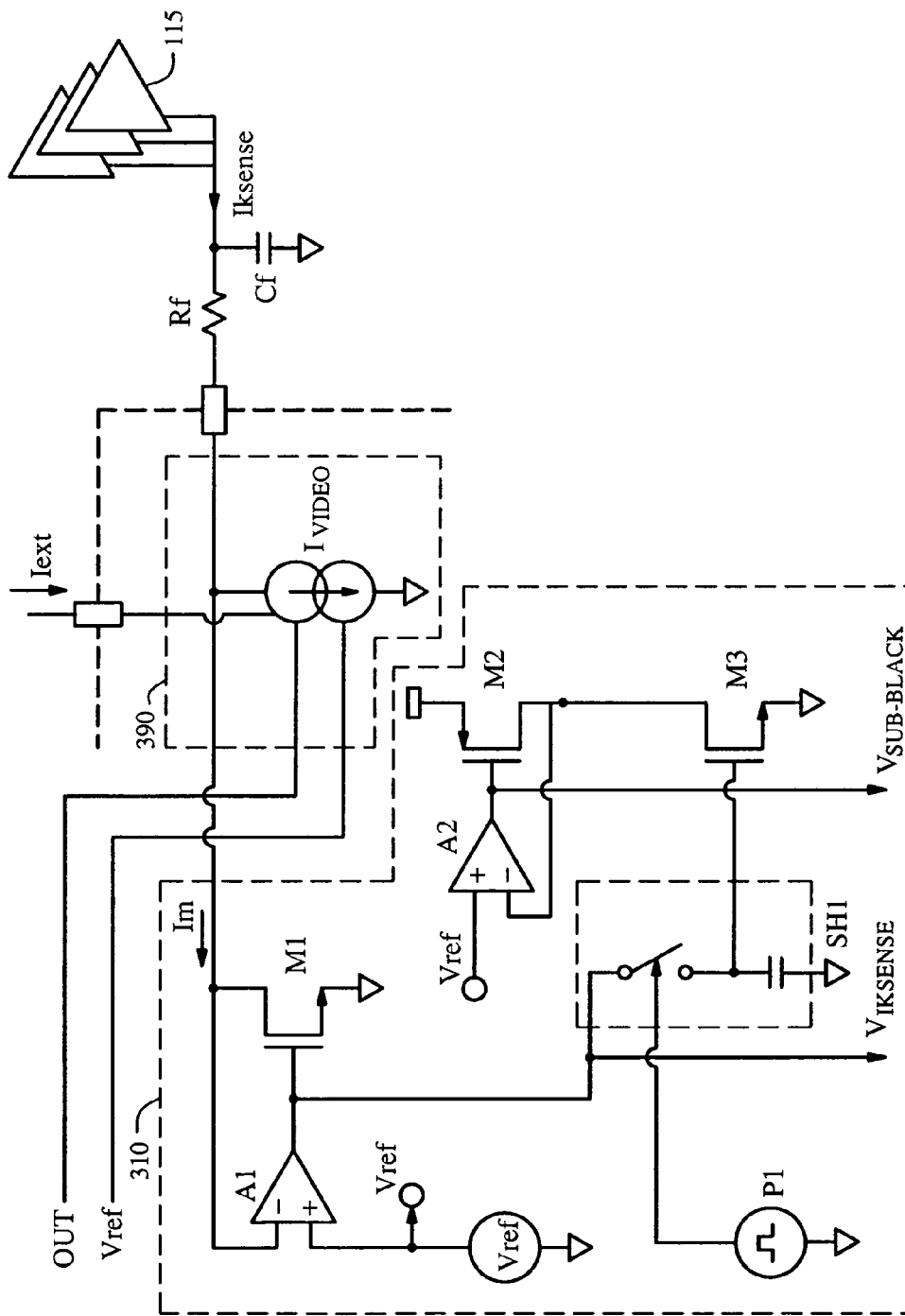
FIG. 3 shows a schematic diagram of an embodiment of a circuit for measuring a signal from a cathode.

FIG. 3 illustrates an embodiment of current compensation circuit 390 and an error amplifier input stage 310 portion of error amplifier circuit 160 of the chip 150 from FIG. 1. Also shown are several gain drivers 115 coupled thereto. The $I_{ksense}$ output from the gain driver(s) 115 may appear as a current source. The chip may have an accurately determined current source internally. For example, a band gap voltage reference and external resistor Rext may be used to create the current source. It is possible to use the current source directly rather than convert to a voltage signal through an external resistor. The $I_{ksense}$ input may appear as a constant voltage source. For example, this may be on the order of 2.5 volts, in one embodiment. High frequency de-coupling may consist of a capacitor and a resistor placed at this point to ground to bypass high frequency transients that result from charging and discharging stray output capacitance, to enable stable operation of the internal voltage source, and to facilitate some arc protection. Suitable values for the filter components are 10 nF and 100 ohms, respectively.

The $I_{ksense}$ signal from the gain driver(s) 115 may consist of the summation of three elements from each of the three channels:

a) current flowing in the recharge resistor (FIG. 1 $R_k$), as a result of cathode voltage signal;

b) the leakage and bias DC currents from the gain driver 115; and c) the CRT beam current.

The first of these is an active signal that may be dependent upon the value of $R_k$ and the cathode signal voltage swing. Current $I_{video}$ is subtracted from current Iksense. In one embodiment, current Ivideo is provided as given by equation 1.

$$I_{video}=(V_R+V_B+V_G)*G_{DRIVER}/R_k \qquad \text{Equation 1}$$

Where $V_R$, $V_B$, and $V_G$ are the video signals at the output of the chip, $G_{DRIVER}$ is the gain of the gain driver 115, and $R_k$ is the resistance of the recharge resistor. Thus, it may be desirable that the value of $R_k$ is fixed and not varied by the application designer.

Still referring to FIG. 3, current Im, which results from $I_{ksense}$ minus $I_{video}$, may connect to the output of an open drain amplifier consisting of a transistor, M1, and an operational amplifier, A1. A1 monitors the voltage at the drain of M1 and references this to an internally generated voltage reference, Vref. A suitable value for Vref is 2.5 volts, although embodiments of the present invention are not so limited. The dynamic signal, $V_{Iksense}$, at the gate of M1 controls the current in M1 such that its drain current substantially equals the summation $I_{ksense}$ minus $I_{video}$ at all times, except at very high frequencies limited by $R_f$ and $C_f$. The dynamic signal, $V_{Iksense}$ may be fed to other stages in the error amplifier circuit.

Leakage Error Signal Measurement and Subtraction

The signal P1 in FIG. 3 may correspond to the logic timing signal $V_{blanksample}$ in FIG. 2. This pulse may be fed into the sample and hold circuit block, SH1, which momentarily samples the gate voltage to M1 at the end of the sub-black period (e.g., defined by $V_{blanksample}$), and applies this to the gate of a substantially identical transistor, M3. Operational amplifier A2 also references the voltage reference Vref and maintains the drain voltages of transistors M2 and M3 at the reference voltage regardless of the current in M3. As M1 and M3 have substantially identical gate voltages during the sampling period $V_{blanksample}$, and both have drain voltages regulated to the reference voltage Vref, the current in M2 and M3 is thus set substantially identical to the level in M1 during the sub-black period. For example, this may be the same as the leakage current level.

Figure 4:
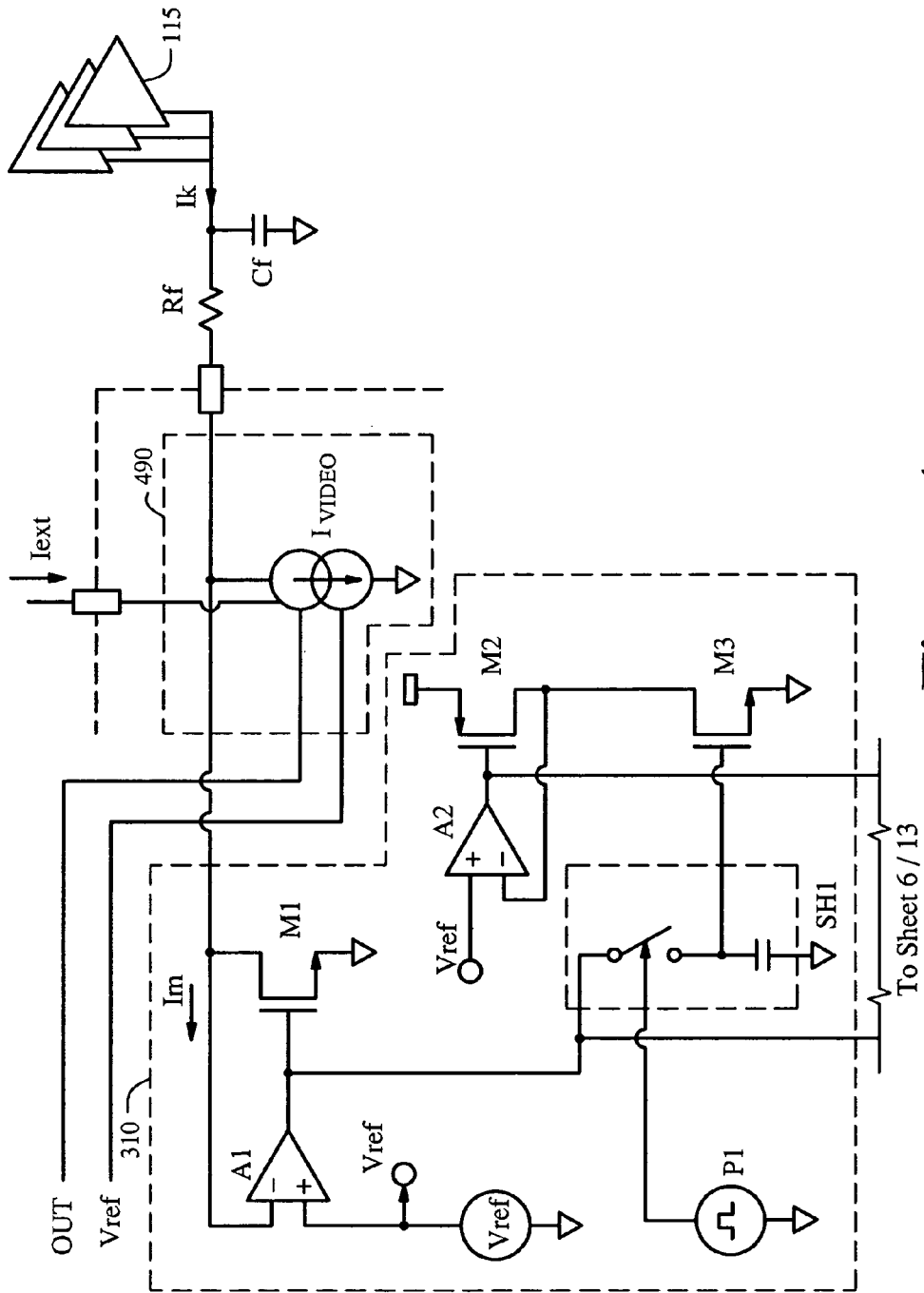
FIG. 4 illustrates a schematic diagram of an embodiment of a circuit for regulating cathode current.
Figure 4:
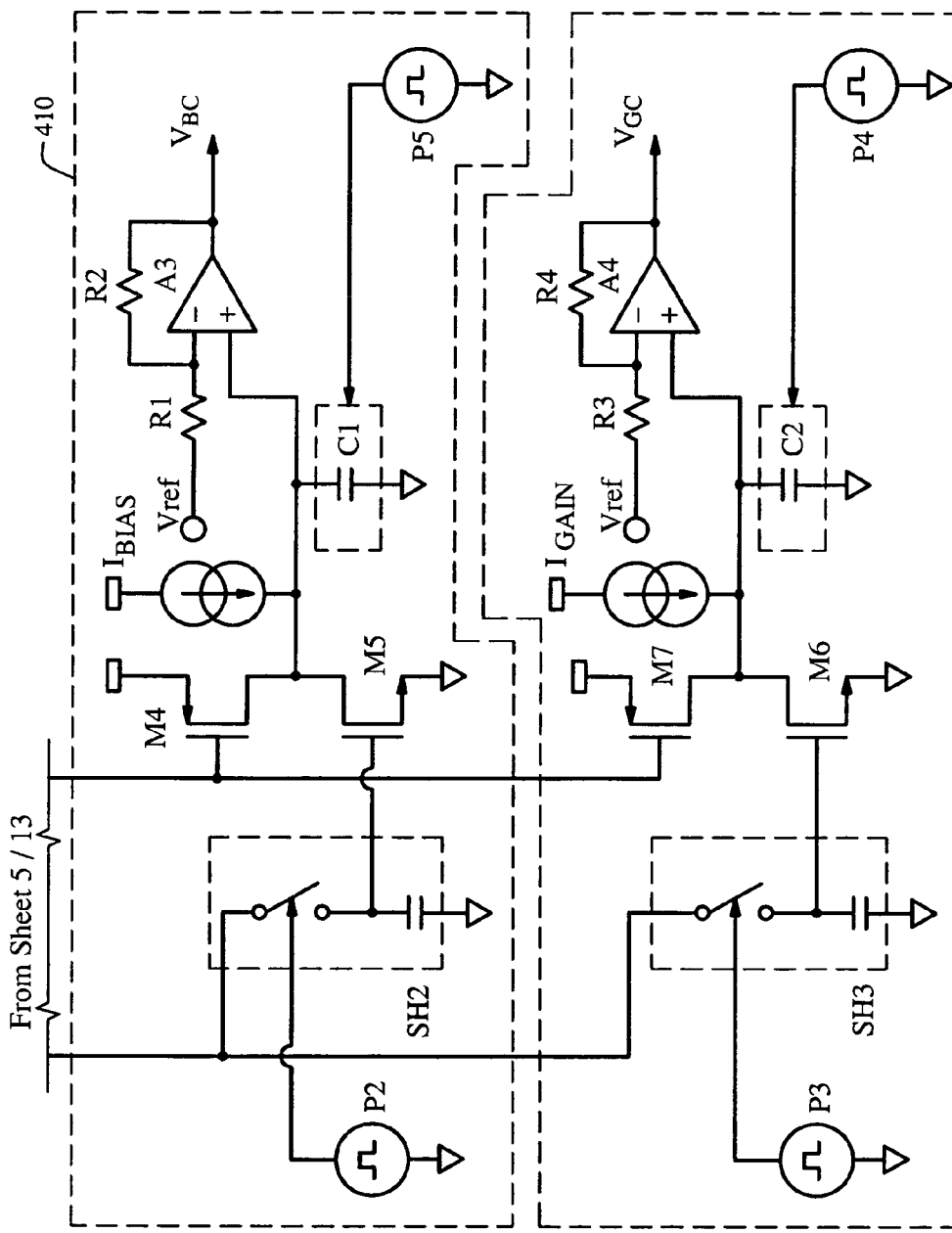

The gate voltages of M1 and M2 (e.g., $V_{Iksense}$ and $V_{sub-black}$) may be fed to stages in each of the three channels. FIG. 4 illustrates an embodiment of current compensation circuit 490 and an error amplifier input stage 310 coupled to a bias level stage control stage 410 and a gain level control stage 420. Each channel may have its own bias level control stage 410 and gain level control stage 420, although only one of each is shown in FIG. 4. However, there need be only one error amplifier input stage 310. The dynamically varying $V^{Iksense}$ signal may be sent to a sample and hold circuit SH2 in the bias level control stage 410 of each channel. The gain level control stage(s) 420 may also receive the dynamically varying $V_{Iksense}$ signal via sample and hold circuit SH3. In this case, the signal P2 may correspond to one of the bias logic timing signals in FIG. 2 (e.g., bias-R, bias-G, and bias-B). In this fashion, the value of $V_{IKSENSE}$ that is sampled corresponds to the period when one of the low-voltage pulses (e.g., FIG. 2, 212–214) is applied to one of the cathodes, depending on whether the bias stage 410 is for the red, blue, or green channel. Thus, the sample and holds in the bias stage 410 samples the gate voltage on M1 during the bias level detection periods, such that the devices M5 and M6 mirror the current in M1 at the time of sampling.

In the bias control stage 410, the gate of M4 is driven by the gate voltage of M2, thus mirroring the current sampled during the sub-black period (e.g., when $V_{BLANKSAMPLE}$ is active in FIG. 2). The drain currents of M4 and M5 are summed with a reference current source ($I_{BIAS}$) that is set at the nominal level of the bias current level. As there is no DC path, the long-term summation of these currents is zero. In the short term, these currents charge or discharge the capacitor C1, producing an error voltage at the input of the operational amplifier A3. The error signal is amplified by the error amplifier that references to the voltage reference source to provide an output voltage, which is fed out of the chip to the clamp amplifiers (FIG. 1, 158). The output voltage of A3, $V_{BC}$, may be used as the control voltage to drive the clamp amplifiers (FIG. 1, 158). The clamp amplifiers amplify this voltage, and the output voltage is used as the clamp voltage to set the bias clamp level of the video clamp pedestal.

The gain control stage 420 functions in a somewhat similar fashion to the bias control stage 410. In this case, the signal P3 may correspond to one of the gain logic timing signals in FIG. 2 (e.g., gain-R, gain-G, and gain-B). In this fashion, the value of $V_{IKSENSE}$ that is sampled corresponds to the period when one of the high-voltage pulses (e.g., FIG. 2, 222–226) is applied to one of the cathodes. The drain currents of M6 and M7 are summed with a reference current source ($I_{GAIN}$) that is set at the nominal level of the gain current level. Further, the control voltage, $V_{GC}$, derived from A4 may be used to vary the voltage controlled gain circuit (FIG. 1, 154).

In one embodiment, during normal linear operation, the voltages across the capacitors C1 and C2 are within 0.5 volts of a typical reference voltage of 2.5 volts, so that the accuracy of the current mirrors is maintained within reasonable limits. Because it may not be practical to fabricate large capacitors within the chip, capacitors C1 and C2 may be simulated using pulses P4 and P5. These pulses may correspond to the logic timing signals P4/5 in FIG. 2. The values for resistors R1–R4 may be selected to achieve the desired gain for amplifiers A3 and A4.

Bias Adjustment Operation

Figure 5:
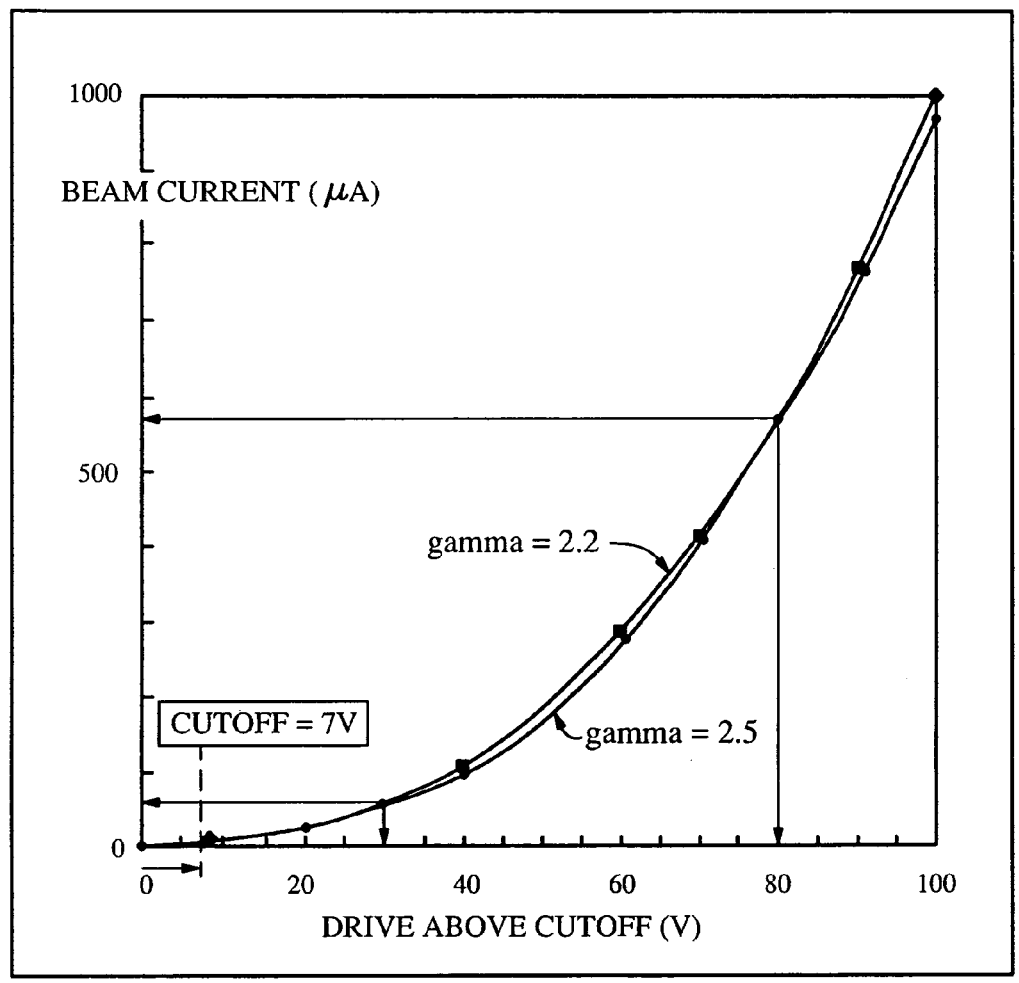
FIG. 5 shows a graph illustrating how variation in CRT gamma affects black level.

The reference current levels may be chosen such that a CRT with a nominal gamma of 2.5 will be automatically set so that the signal black level corresponds to cutoff to the CRT. However, if the gamma is different, or some other source of error exists, then the black level and cutoff voltage will not be equal. For example, a CRT with a gamma of 2.2 may have a cutoff voltage that is 7 volts lower than that of a CRT with a gamma of 2.5, as shown in FIG. 5. To allow for variation in the setup point of the cutoff, either one or both of the test voltage pulses (e.g., FIG. 2, $V_{BIAS}$ 212–216 or $V_{GAIN}$ 222–226) or one or both of the reference current levels (e.g., FIG. 4, $I_{BIAS}$ or $I_{GAIN}$) can be adjusted.

Referring again to FIG. 1, to facilitate the bias adjustment, the bias reference current (e.g., $I_{BIAS}$, FIG. 4) may be varied by a bias DAC 172. For example, the value may be altered by +/–25 µA about the nominal value. This adjustment may be performed as a factory setting before the device with the CRT is shipped. This variation in bias current reference corresponds to a variation in cathode voltage drive, so the bias control loop adjusts the bias DC level up or down as appropriate. Movement of the DC bias level may also affect the high level cathode drive, and so the gain loop then also reacts to maintain its feedback beam current at the maximum reference level (e.g., $I_{GAIN}$, FIG. 4). The ratio of the low to high test pulses may be fixed, for example at 5:8, although this is not limiting. This may mean that a change in gain may multiply a +/–6 volts variation to create a +/–15 volts effective variation in the black level. This leverage can be seen from the Equation 2. At the cathode, the ratio of the black level voltage, $V_B$, the low level voltage drive, $V_L$, and the high level voltage drive $V_H$, must be in the ratio P where:

$$V_B - V_L = P*(V_B - V_H) \qquad \text{Equation 2}$$

Thus, $$V_B = V_L - (P*V_H)/(1-P) \qquad \text{Equation 3}$$

The variation in the black level $V_B$ with variation in $V_L$, keeping $V_H$ constant is thus:

$$dV_B/dV_L = 1/(1-P) \qquad \text{Equation 4}$$

With P=5/8, this means that the variation in black level is around 2.7 times greater that the variation in the black level as a result of the variation in the reference current level.

When the bias is manually adjusted to vary the black level during setup, the gain will also vary. Thus, bias adjustment should be carried out before any high-level color balance operations are performed.

Referring still to FIG. 1, the brightness test signal 132 for each channel may be created by ORing the bias and gain control pulses together. An 8-bit digitally controlled attenuator 174 may be used as a gain control. A channel specific bi-directional brightness test signal 132 is added into the video prior to the digital attenuator block 174 in order that the video signal 130 and the brightness test signal 132 are equally affected by the gain setting.

Figure 6:
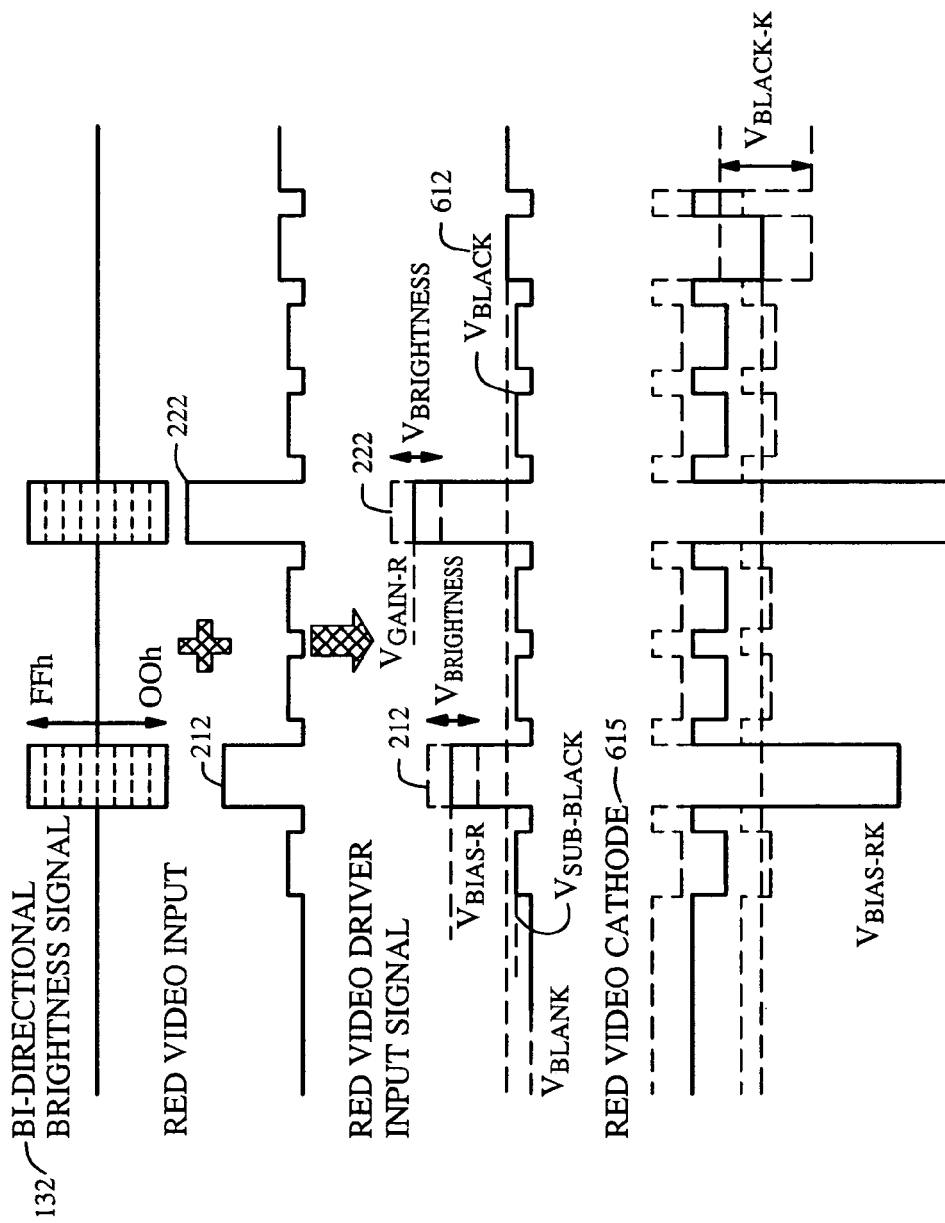
FIG. 6 shows a diagram illustrating variation in test signals with brightness.

Referring now to FIG. 6, the variable brightness signal 132 adds to, or subtracts from, the low 212 and high level 222 test signals, altering the peak to peak relative to the black level 612 and hence the ratio of these signals. The cathode gain drives 115 are maintained by the closed loop operation, such that the beam current at the sampled points is always maintained at a level that is substantially equal to the reference current levels. Thus, even as the drive signals vary, the cathode voltage drive and hence beam current at these test levels stays constant. For example, the voltage $V_{BIAS-RK}$ and $V_{GAIN-RK}$ in the red video cathode signal 615 remain fixed, while the dashed portion of the signal reflects the variation. As in the bias adjustment, the voltage drives stay in the proportion P, such that:

$$V_B - (V_L + V_{BR}) = P*(V_B - (V_H + V_{BR}))$$  Equation 5

Or $$V_B = (V_L + V_{BR}) - (P*(V_H + V_{BR}))/(1-P)$$  Equation 6

As P, $V_L$ and $V_H$ are all constant, it thus follows that:

$$dV_B/dV_{BR} = 1$$  Equation 7

That is, the black level varies directly with the addition brightness signal offset.

Embodiment of a Circuit for Providing a Process-Independent Current

Figure 7:
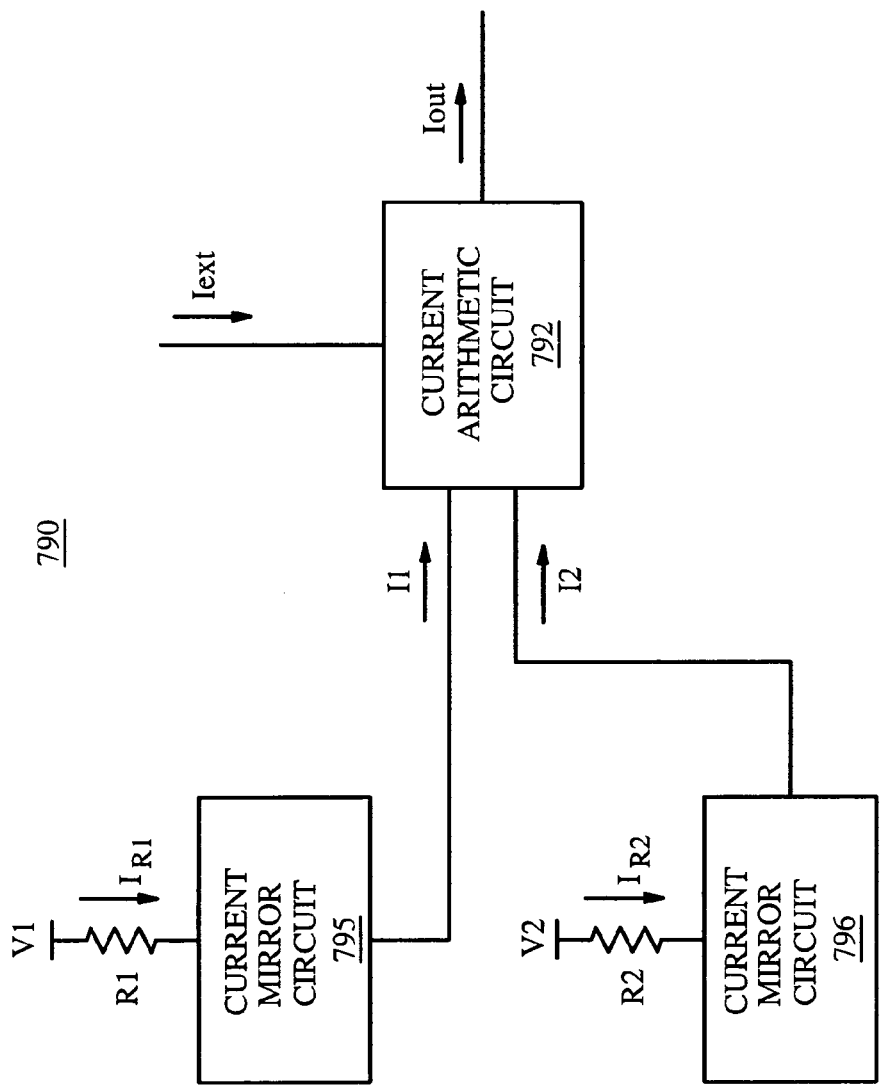
FIG. 7 illustrates a block diagram of an embodiment of a circuit for generating a substantially process-independent current.

FIG. 7 illustrates a block diagram of an embodiment of circuit 790 for generating a temperature independent current. One embodiment of circuit 790 may be employed as current compensation circuit 190 of FIG. 1, as explained in greater detail below. However, other embodiments of circuit 790 may be employed for applications that are unrelated to autobias applications or CRT applications. Circuit 790 may include components such as resistor circuits R1 and R2, current mirror circuits 795 and 796, and current arithmetic circuit 792.

Resistor circuit R1 is arranged to provide current $I_{R1}$ based, in part, on voltage V1. Similarly, resistor circuit R2 is arranged to provide current $I_{R2}$ based, in part, on voltage V2. In one embodiment, circuit 790 is included in an integrated circuit, and resistor circuits R1 and R2 are monolithic resistors in the integrated chip which have resistances that vary with process. Resistor circuits R1 and R2 are matched.

Current mirror circuits 795 and 796 are optional components that need not be included in circuit 790. In one embodiment, current mirror circuit 795 is arranged to provide current I1 based on current $I_{R1}$, and current mirror circuit 796 is arranged to provide current I2 based on current $I_{R2}$. In one embodiment, current I1 is substantially identical to current $I_{R1}$, and current I2 is substantially identical to current $I_{R2}$. In other embodiments, a gain factor may be applied to current I1 and/or current I2 based on current mirror ratios.

Also, current arithmetic circuit 792 is arranged to provide current Iout such that current Iout is substantially given by:

$$Iout = A*I1*(Iext/I2),$$  Equation 8 where A corresponds to a substantially constant factor, and Iext is an external current. Because resistor circuits R1 and R2 are matched, current Iout is substantially independent of process even if the resistances of resistors R1 and R2 vary with process.

In one embodiment, resistor circuit R1 and resistor circuit R2 each consist of a single resistor. In other embodiments, one of both of resistors circuit R1 and R2 may include two or more resistors combined in series and/or in parallel to provide a combined equivalent resistance.

Embodiment of a Current Compensation Circuit

Figure 8:
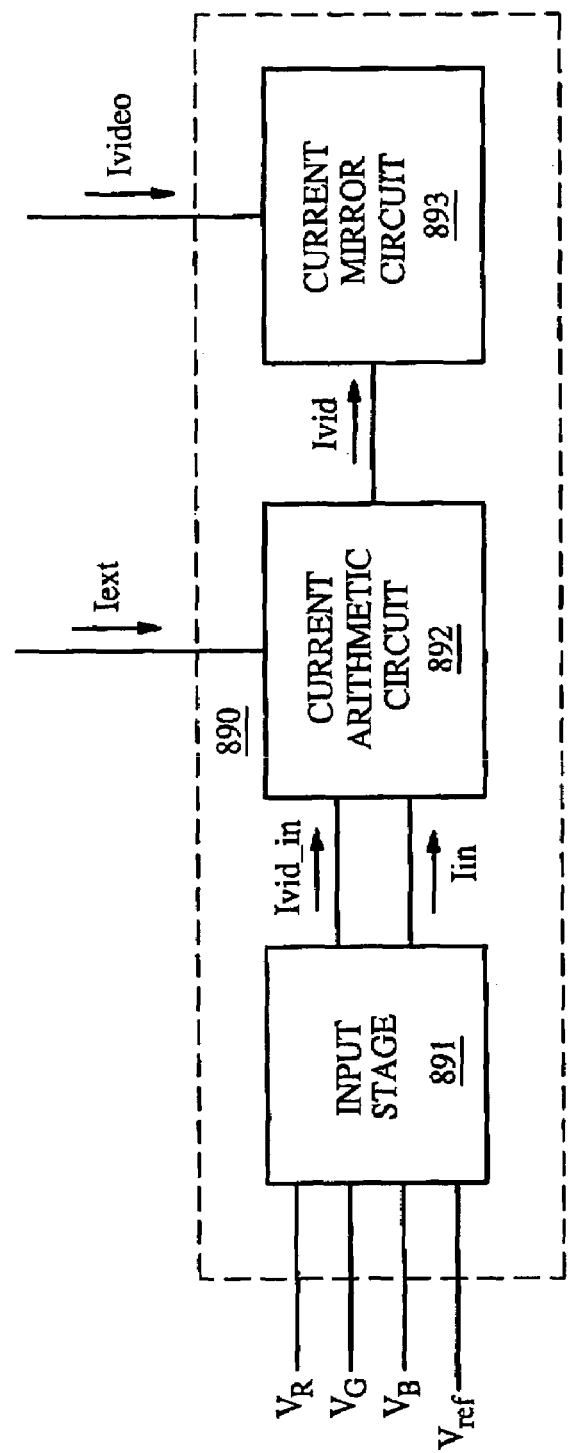
FIG. 8 shows an embodiment of the circuit of FIG. 7 that may be employed as an embodiment of the current compensation circuit of FIGS. 1, 3, and 4.

FIG. 8 shows an embodiment of current compensation circuit 890. Current compensation circuit 890 may operate in a substantially similar manner to current compensation circuit 190 of FIG. 1, current compensation circuit 390 of FIG. 3, current compensation circuit 490 of FIG. 4, and circuit 790 of FIG. 7, and may operate in a different manner in some ways. Current compensation circuit 890 includes current mirror circuit 893, current arithmetic circuit 892, and input stage 891. Input stage 891 is an input stage of current compensation circuit 890, and is not to be confused with error amplifier input stage 310 of FIG. 1, which is an embodiment of an input stage of error amplifier circuit 160.

In operation, current compensation circuit 890 provides current Ivideo to compensate for the effect of the Rk resistor in each clamp circuit 140 in current Iksense. Further, as discussed above, current compensation circuit 890 may be arranged to provide current Ivideo as:

$$I_{video} = (V_R + V_B + V_G) * G_{DRIVER}/R_k$$  Equation 1 where $G_{DRIVER}$ is the gain of driver 115 of FIG. 1, and it is assumed that the gain of each driver 115 is substantially the same, and that the resistance of each resistor Rk is substantially the same. Also, voltage Vs may be generated from a summing amplifier such that voltage Vs is substantially given by:

$$V_S = (V_R + V_B + V_G) * G_{SUMMINGAMPLIFIER}.$$  Equation 9

Accordingly, $$I_{VIDEO} = (V_S/G_{SUMMINGAMPLIFIER}) * (G_{DRIVER}/R_K)$$  Equation 10

Since $V_R$, $V_B$, $V_G$, and Rk are substantially process-independent, Ivideo is provided as a substantially process-independent current in order to accurately subtract current Ivideo from current Iksense. Further, current compensation circuit 890 is arranged to provide current Ivideo as a substantially process-independent current even if resistors employed in current compensation circuit 890 are monolithic resistors having resistances that vary with process.

Current compensation circuit 890 may employ two internal matched resistors, Rkin and Rin. Also, current compensation circuit 890 is arranged to receive external current Iext, where current Iext is generated from voltage Vref and external resistor Rext. Current Ivideo may be determined based on the following:

Equation 11:

$$Ivideo = Vs/Rk$$
$$= (Vs/Rkin) * (Rkin/Rk)$$
$$= (Vs/Rkin) * (Rin/Rext)$$
$$= (Vs/Rkin) * [(Vref/Rext)/(Vref/Rin)]$$
$$= (Vs/Rkin) * (Iext/Iin)$$
$$= (Ivid\_in) * (Iext/Iin),$$

where:

Rkin=resistance of the monolithic recharge resistor

Rk=resistance of the external recharge resistor

Rin=resistance of an internal resistor

Rext=resistance of an external resistor

Vref=temperature and process independent voltage reference

Iext=current generated from Vref and external resistor Rext

Iin=current generated from Vref and internal resistor Rin

Ivid_in=current generated from Vs and internal resistor Rkin

The equation:

$$(Rkin/Rk) = (Rin/Rext) \quad \text{Equation 12}$$

is valid as long as Rin matches with Rkin and Rk matches with Rext. Gain factors (e.g. $G_{SUMMINGAMPLIFIER}$ and $G_{DRIVER}$) are ignored in the above equation, since they can subsequently be compensated for by a current mirror, or by other means.

Input stage 891 may be configured to provide current Ivid_in based, in part, on voltages $V_R$, $V_G$, and $V_B$; and further configured to provide current Iin from voltage Vref. In one embodiment, currents Ivid_in and Iin are provided by employing matched monolithic resistors (e.g. Rkin and Rin).

Additionally, current arithmetic circuit 892 may be arranged to provide current Ivid such that current Ivid is substantially given by:

$$Ivid = A * Ivid\_in * (Iext/Iin), \quad \text{Equation 13}$$

where A corresponds to a substantially constant factor. Current mirror circuit 893 may be arranged to provide current Ivideo such that current Ivideo is given by B*Ivid, where B is another substantially constant factor that corresponds, for example, to the ratio of current mirror circuit 893. Factor B may be pre-selected such that Ivideo is substantially equal to the sum of the current flowing through each of the three Rk resistors in the three clamping circuit 140 of FIG. 1.

Figure 9:
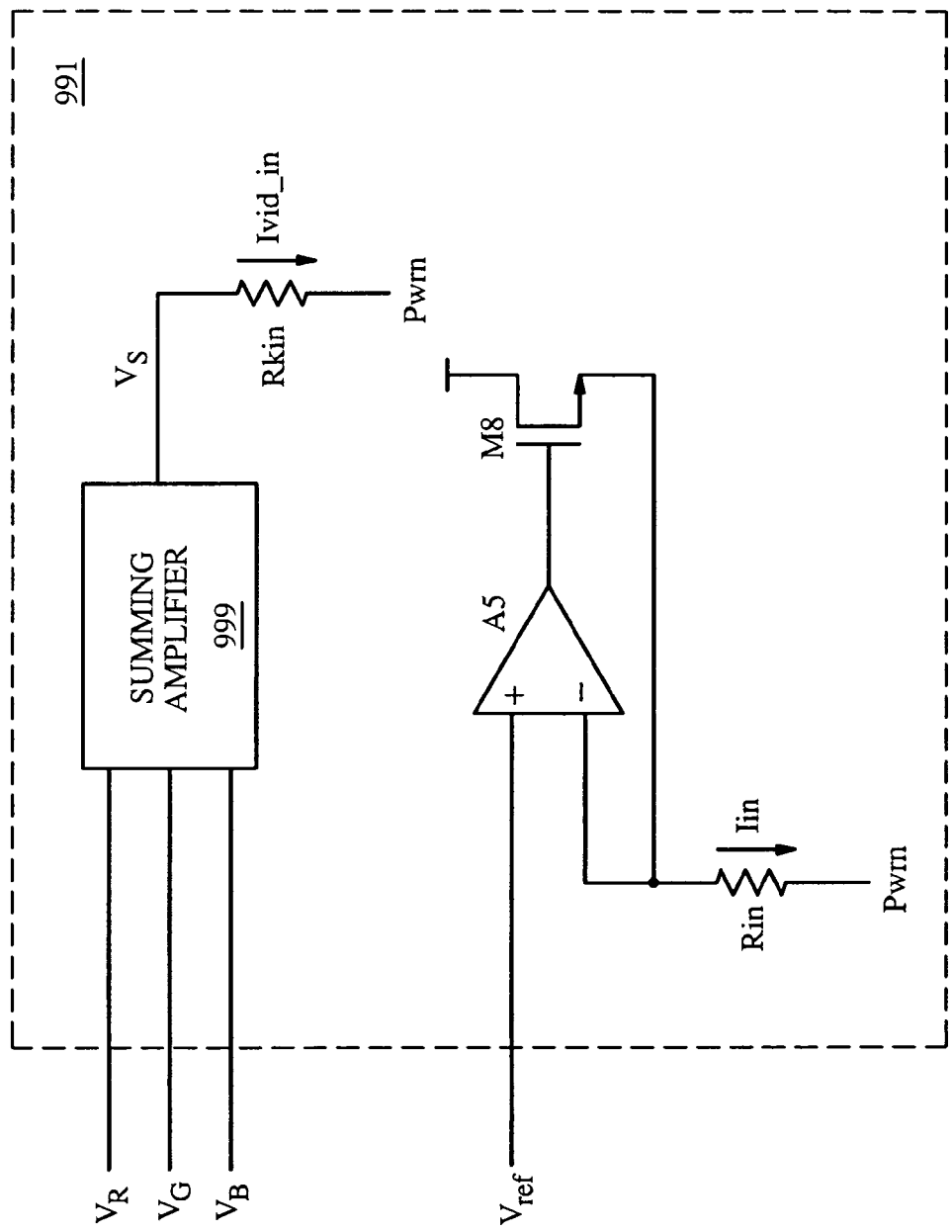
FIG. 9 illustrates an embodiment of the input stage of FIG. 8.

FIG. 9 illustrates an embodiment of input stage 991. Input stage 991 may operate in a substantially similar manner to input stage 891 of FIG. 8, and may operate in a different manner in some ways. Input stage 991 includes summing amplifier 999, resistors Rkin and Rin, amplifier A5, and transistor M8.

In operation, summing amplifier 999 may provide voltage Vs such that voltage Vs is substantially given by:

$$Vs = G_{SUMMINGAMPLIFIER} * (V_R + V_G + V_B), \text{ where} \quad \text{Equation 14}$$

$G_{SUMMINGAMPLIFIER}$ is the gain of summing amplifier 999. Resistor Rkin may be arranged to provide current Ivid_in such that current Ivid_in is substantially given by:

$$Ivid\_in = G_{SUMMINGAMPLIFIER} * (V_R + V_G + V_B)/Rkin \quad \text{Equation 15}$$

Resistor Rin may be arranged to provide current Iin based, in part, on voltage Vref. In one embodiment, currents Ivid_in and Iin are provided to current arithmetic circuit 892 of FIG. 8 via current mirrors.

In one embodiment, the factor (e.g. current mirror ratio) B of FIG. 8 above may be pre-selected as $G_{DRIVER}/(A*G_{SUMMINGAMPLIFIER})$ to cancel the effects of A, $G_{SUMMINGAMPLIFIER}$, and $G_{DRIVER}$.

Figure 10:
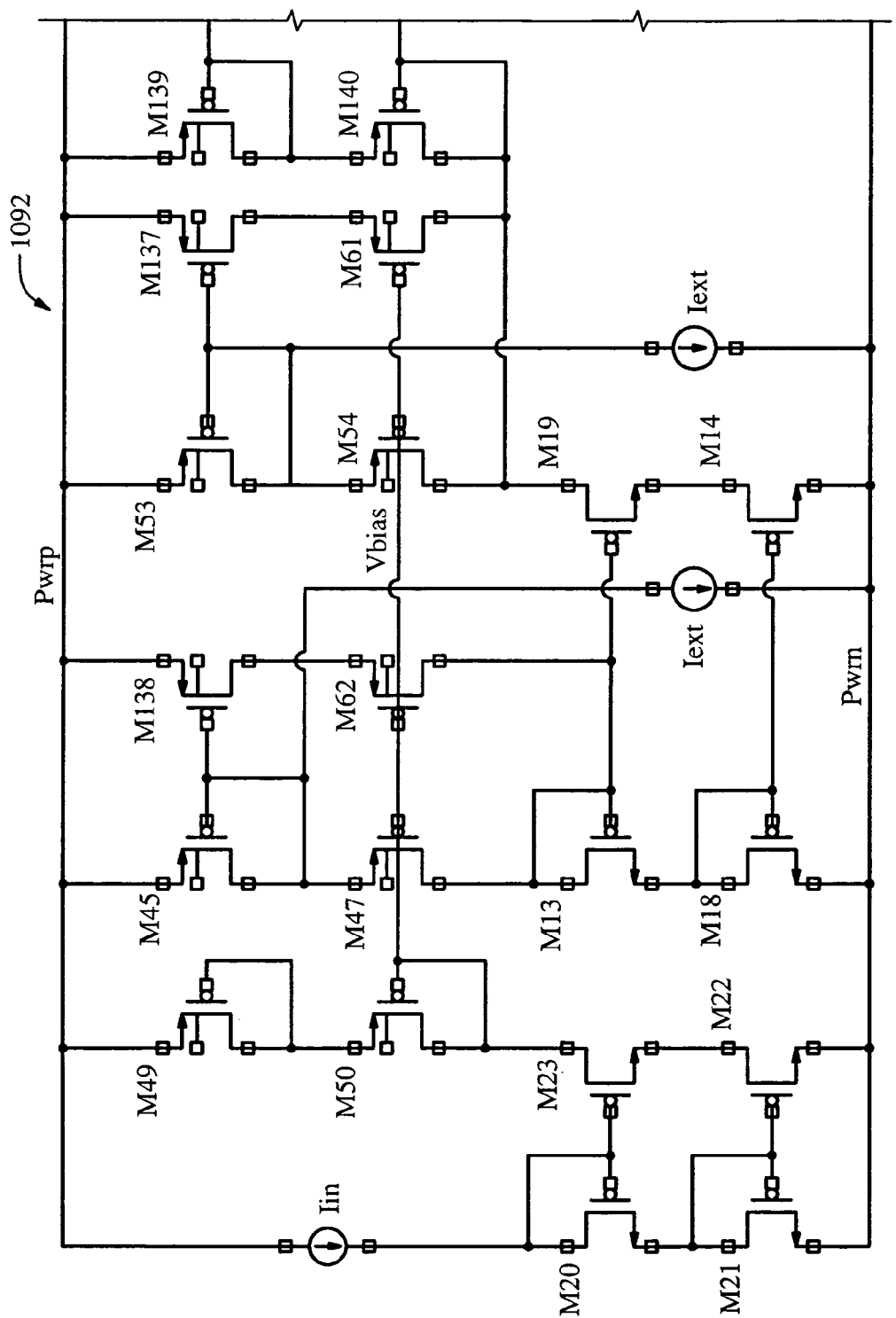
FIG. 10 shows an embodiment of the current arithmetic circuit of FIG. 8, arranged in accordance with aspects of the invention.
Figure 10:
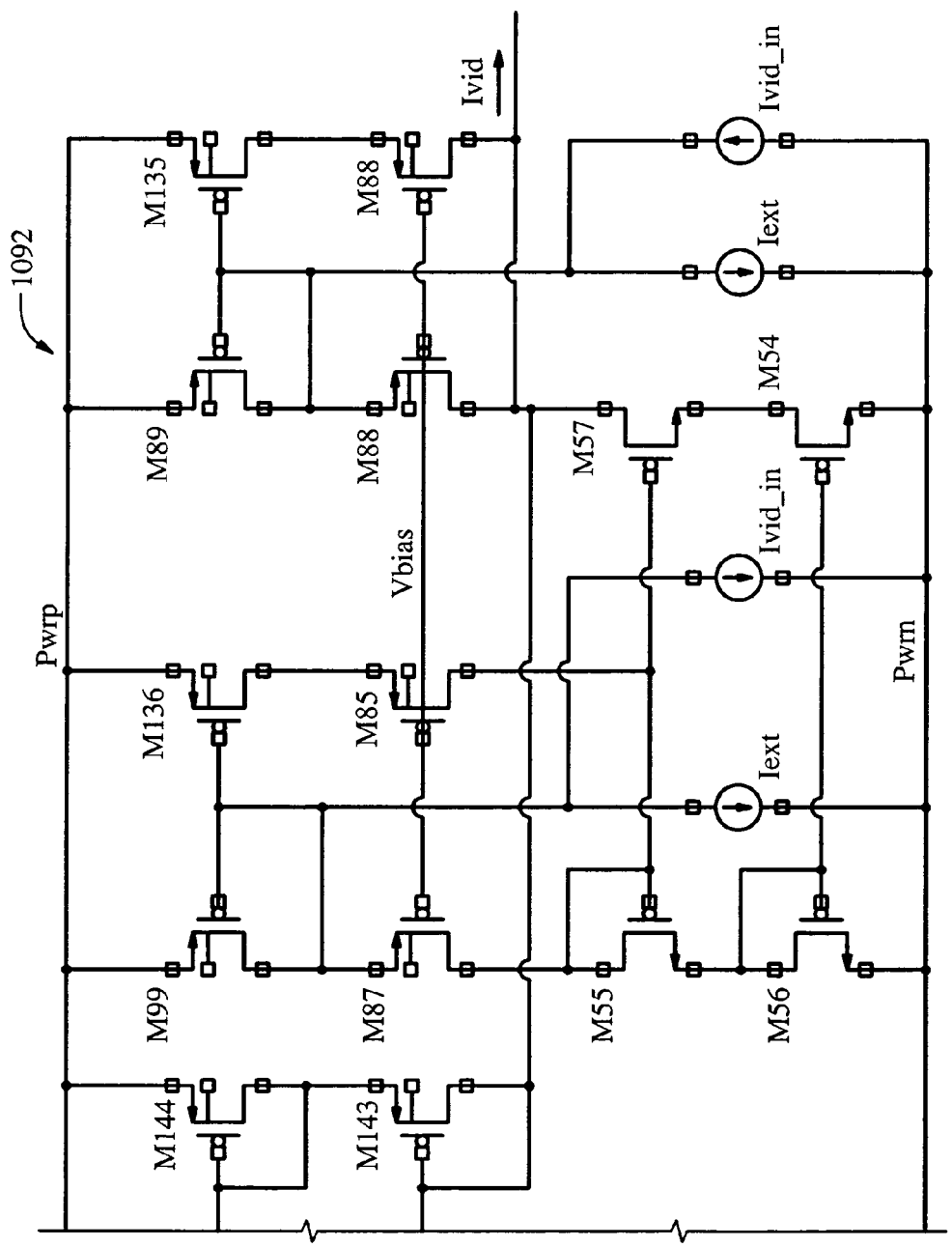

Current arithmetic circuit 892 may be implemented in many ways. One embodiment of a current arithmetic circuit is illustrated in FIG. 10 below. However, other embodiments of current arithmetic circuits are within the scope and spirit of the invention.

FIG. 10 shows an embodiment of current arithmetic circuit 1092. Current arithmetic circuit 1092 may operate in a substantially similar manner as described with regards to current arithmetic circuit 792 of FIG. 7 and current arithmetic circuit 892 of FIG. 8, and may operate in a different manner in some ways.

Several current sources are illustrated in FIG. 10, which need not literally be current sources, but rather may indicate places at which various currents are input to current arithmetic circuit 1092.

Transistors M20–M23 operate as a cascoded current mirror that is arranged to receive current Iin at the drain of transistor M20. Transistors M20–M23 are field effect transistors (FETs) that operate in saturation mode. Transistors M20–M23 are arranged to provide voltage Vbias to the gate of transistors M87, M85, M88, and M86. Voltage Vbias is programmed by current Iin, substantially according to the equation $$Iin = \tfrac{1}{4}K(Vbias - 2Vt)^2,$$

where Vt is a transistor threshold voltage which is assumed to be substantially the same for each of the transistors in current arithmetic circuit 1092.

Additionally, transistors M90, M87, M85, and M136 operate as a first square function circuit, and transistors M89, M88, M135, and M86 operate as a second square function circuit. Transistors in the first and second square functions circuits are FETs that operate in saturation mode. Further, transistors M90 and M136 operate as a current mirror, transistors M89 and M135 operate as another current mirror, and transistors M56 and M54 operate as yet another current mirror. Current arithmetic circuit 1092 is arranged to provide current Ivid such that current Ivid is substantially given by ½*Ivid_in*(Iext/Iin), as follows.

Let $I_3$=current through M90=current through M136/M85, $I_4$=current through M87, Va=Vgs of M90, and Vb=Vgs of M87, so that Va+Vb=Vbias. Also, current arithmetic circuit 1092 is arranged so that:

I3−I4=Iext+Ivid_in, and

Current through M55=I3+I4.

Equation 17:

$$\begin{aligned}I_3 - I_4 &= K(Va - Vt)^2 - K(Vb - Vt)^2 \\ &= K(Va^2 - 2VaVt + Vt^2 - Vb^2 + 2VbVt - Vt^2) \\ &= K(Va^2 - VaVb + VaVb - 2VaVt + Vt^2 - Vb^2 + 2VbVt - Vt^2) \\ &= K(Va + Vb - 2Vt)(Va - Vb) \\ &= K(V_{bias} - 2Vt)(Va - Vb)\end{aligned}$$

So, $$(Va - Vb) = (I_3 - I_4)/K(Vbias - 2Vt) \quad \text{Equation 18}$$

Equation 19:

$$\begin{aligned}I_3 + I_4 &= K(Va - Vt)^2 + K(Vb - Vt)^2 \\ &= K(Va^2 - 2VaVt + Vt^2 + Vb^2 - 2VbVt + Vt^2) \\ &= K(Va^2 - 2VaVt + Vt^2 + Vb^2 - 2VbVt + Vt^2 + VaVb - VaVb) \\ &= \frac{1}{2}K(2Va^2 - 4VaVt + 4Vt^2 + 2Vb^2 - \\ &\quad 4VbVt + 2VaVb - 2VaVb) \\ &= \frac{1}{2}K(Va^2 + Vb^2 + 2VaVb + Va^2 + Vb^2 - \\ &\quad 2VaVb - 4Vt(Va + Vb) + 4Vt^2) \\ &= \frac{1}{2}K((Va + Vb)^2 - 4Vt(Va + Vb) + 4Vt^2 + (Va - Vb)^2) \\ &= \frac{1}{2}K(V_{bias} - 2Vt)^2 + \frac{1}{2}K(Va - Vb)^2 \\ &= \frac{1}{2}K(V_{bias} - 2Vt)^2 + (I_3 - I_4)^2 / 2K(V_{bias} - 2Vt)^2 \\ &= 2*Iin + (I_3 - I_4)^2 / 8Iin \\ &= 2*Iin + (Iext + Ivid\_in)^2 / 8Iin\end{aligned}$$

The source current of transistor M55, which is substantially given by I3+I4, is mirrored to the drain of M57. Current arithmetic circuit 1092 is arranged such that current Ivid is substantially given by:

Equation 20:

$$\begin{aligned}Ivid &= I_{dM88} + I_{dM86} - I_{dM57} \\ &= [2*Iin + (Iext - Ivid\_in)^2/8Iin] - \\ &\quad [2*Iin + (Iest + Ivid\_in)^2/8Iin] \\ &= \frac{1}{2}*Ivid\_in*(Iext/Iin)\end{aligned}$$

The above specification, examples and data provide a description of the manufacture and use of the composition of the invention. Since many embodiments of the invention can be made without departing from the spirit and scope of the invention, the invention also resides in the claims hereinafter appended.

What is claimed is:

1. A circuit for generating a substantially process-independent current, comprising:
   a first resistor circuit that is arranged to provide a first current based, in part, on a first voltage;
   a second resistor circuit that is arranged to provide a second current based, in part, on a second voltage, wherein the second resistor circuit is substantially matched with the first resistor circuit;
   a current arithmetic circuit that is arranged to provide the substantially process-independent current at a current node such that the substantially process-independent current is substantially given by: A*I1*(Iext/I2), wherein A corresponds to a substantially constant predetermined factor, I1 corresponds to the first current, I2 corresponds to the second current, and Iext corresponds to an external current wherein an output of the current arithmetic circuit is coupled to the current node, and the current arithmetic circuit is arranged to receive the external current.

2. The circuit of claim 1, wherein the circuit is included in an integrated circuit, and wherein the first and second resistor circuits are monolithic resistors in the integrated circuit.

3. The circuit of claim 1, further comprising:
   a voltage reference circuit that is arranged to provide the second voltage such that the second voltage is substantially independent of temperature and process.

4. The circuit of claim 1, further comprising:
   a current mirror circuit that is configured to provide a correction current from the substantially process-independent current, and arranged such that a modified sense current is provided such that the modified sense current is substantially equal to a sense current minus the correction current; and
   an error amplifier circuit that is arranged to provide gain control and bias control signals based, in part, on the modified sense current.

5. The circuit of claim 4, further comprising:
   an amplifier circuit that is arranged to provide: a red channel video signal such that the red channel video signal substantially corresponds to a multiplicative product of a gain value of the gain control signal and a voltage that is associated with a red channel amplifier input signal; a green channel video signal such that the green channel video signal substantially corresponds to a multiplicative product of the gain value and a voltage that is associated with a green channel amplifier input signal; and a blue channel video signal such that the blue channel video signal substantially corresponds to a multiplicative product of the gain value and a voltage that is associated with a blue channel amplifier input signal.

6. The circuit of claim 5, further comprising a summing amplifier that is arranged to provide the first voltage from the red channel video signal, the green channel video signal, and the red channel video signal.

7. The circuit of claim 1, wherein the current arithmetic circuit includes:
   a first square function circuit that is arranged to receive a first square function input current that corresponds to a sum of the first current and the external current, and to provide a first square function output current to the current node; and
   a second square function circuit that is arranged to receive a second square function input current that corresponds to a difference between the first current and the external current, and to provide a second square function output current to the current node such that the substantially process-independent current substantially corresponds to the difference between the first square function output current and the second square function output current.

8. The circuit of claim 7, wherein the first square function circuit includes:
- a current mirror that is arranged to provide a first mirror current, wherein the current mirror includes a plurality of field effect transistors that are each arranged to operate in saturation mode; and
- another field effect transistor including a gate, wherein the other field effect transistor is arranged: to operate in saturation mode, to receive a bias voltage at the gate, and to provide another current such that the other current is substantially equal to the first mirror current minus the first current; and wherein the first square function output current is based on a sum of the other current and the first mirror current.

9. The circuit of claim 7, further comprising a bias voltage generation circuit, wherein the bias voltage generation circuit is arranged to provide a bias voltage from the second current such that a portion of the bias voltage is substantially inversely proportional to the second current, and wherein the first and second square function circuits are each arranged to receive the bias voltage.

10. The circuit of claim 9, wherein the bias voltage generation circuit includes a cascoded current mirror circuit.

11. A circuit for current compensation, comprising:
- a first resistor circuit that is arranged to provide a first current based, in part, on a first voltage, wherein an external recharge resistor circuit is arranged to provide an external recharge current, and wherein the first voltage is based, in part, on a voltage across the external recharge resistor circuit;
- a second resistor circuit that is arranged to provide a second current based, in part, on a reference voltage, wherein the second resistor circuit is substantially matched with the first resistor circuit;
- a current arithmetic circuit that is arranged to provide a substantially process-independent current such that the substantially process-independent current is substantially given by: $A*I1*(Iext/I2)$, wherein A corresponds to a substantially constant predetermined factor; I1 corresponds to the first current; I2 corresponds to the second current; Iext corresponds to another external current; and wherein the said another external current is provided by another external resistor circuit based, in part, on the reference voltage.

12. The circuit of claim 11, further comprising:
- a voltage reference circuit that is arranged to provide the reference voltage such that the reference voltage is substantially independent of temperature and process.

13. The circuit of claim 11, wherein the external recharge resistor circuit is matched with the other external resistor circuit.

14. The circuit of claim 11, further comprising:
- a current mirror circuit that is configured to provide a correction current from the substantially process-independent current, and arranged such that a modified sense current is provided such that the modified sense current is substantially equal to a sense current minus the correction current, wherein the sense current is received at a sense node; and
- an error amplifier circuit that is arranged to provide gain control and bias control signals based, in part, on the modified sense current.

15. The circuit of claim 14, wherein the error amplifier circuit is configured to provide the bias control signal to an external clamp amplifier, and wherein the external recharge amplifier is coupled between the external clamp amplifier and a cathode node.

16. The circuit of claim 15, further comprising an internal amplifier that is arranged to provide a video signal to an external driver circuit such that video signal substantially corresponds to a multiplicative product of a gain value of the gain control signal and a voltage that is associated with an amplifier input signal, wherein the external driver circuit is AC-coupled to the cathode node.

17. The circuit of claim 16, further comprising:
- a multiplexer that is arranged to provide a multiplexer output signal by multiplexing a video input signal and a test signal, wherein the amplifier input signal is based, in part, on the multiplexer output signal; and
- a reference signal timing and pulse generation logic circuit that is arranged to provide the test signal, and further arranged to control the multiplexing of the multiplexer.

18. The circuit of claim 14, further comprising an internal amplifier circuit,
- wherein the error amplifier circuit is configured to provide the bias control signal to a red channel external clamp amplifier, a green channel external clamp amplifier, and to a blue channel external clamp amplifier;
- the external recharge resistor circuit includes a red channel external recharge resistor circuit—matched to the other resistor circuit—that is coupled between the red channel external clamp amplifier and a red channel cathode node, a green channel external recharge resistor circuit—matched to the other resistor circuit—is coupled between the green channel external clamp amplifier and a green channel cathode node, and a blue channel external recharge resistor circuit—matched to the other resistor circuit—is coupled between the blue channel external clamp amplifier and a blue channel cathode node;
- the internal amplifier circuit is arranged to provide a red channel video signal to a red channel external driver that is AC-coupled to the red channel cathode node, a green channel video signal to a green channel external driver that is AC-coupled to the green channel cathode node, and a blue channel video signal to a blue channel external driver that is AC-coupled to the blue channel cathode node, such that the red channel video signal substantially corresponds to a multiplicative product of a gain value of the gain control signal and a voltage that is associated with a red channel amplifier input signal, the green channel video signal substantially corresponds to a multiplicative product of the gain value of the gain control signal and a voltage that is associated with a green channel amplifier input signal, and such that the blue channel video signal substantially corresponds to a multiplicative product of the gain value of the gain control signal and a voltage that is associated with a blue channel amplifier input signal;
- the red channel external driver is configured to provide a red channel sense current to the sense node, the green channel external driver is configured to provide a green channel sense current to the sense node, and wherein the blue channel external driver is configured to provide a blue channel sense current to the sense node.

19. The circuit of claim 18, further comprising a summing amplifier that is arranged to provide the first voltage from the red channel video signal, the green channel video signal, and the red channel video signal.

20. An apparatus for generating a substantially process-independent current, comprising:
- means for providing a first current, based, in part, on a first voltage;

means for providing a second current based, in part, on a second voltage, wherein the means for providing the first current is substantially matched with the means for providing the second current; and means for providing the substantially process-independent current such that the substantially process-independent current is substantially given by: $A*I1*(Iext/I2)$, wherein A corresponds to a substantially constant predetermined factor, I1 corresponds to the first current, I2 corresponds to the second current, and Iext corresponds to an external current wherein the means for providing the substantially process-independent current is arranged to receive the external current.

* * * * *

UNITED STATES PATENT AND TRADEMARK OFFICE
CERTIFICATE OF CORRECTION

PATENT NO. : 6,998,782 B1
APPLICATION NO. : 10/921499
DATED : February 14, 2006
INVENTOR(S) : Charles Guan It is certified that error appears in the above-identified patent and that said Letters Patent is hereby corrected as shown below:

TITLE PAGE, ITEM (74) (Attorney, Agent or Firm), Line 1, Delete "PC;" and insert -- P.C.;--.

In the Drawings:

Sheet 5 of 13 Right Hand Side (Fig. 4), Line 1, Delete "Ik" and insert -- Iksense --.

Sheet 12 of 13 Outside Right Boundary (Fig. 10), Line 1, Insert -- To Sheet 13/13 --.

Sheet 13 of 13 Outside Leftt Boundary (Fig. 10), Line 1, Insert -- To Sheet 12/13 --.

Column 3, Line 14, Delete "bidrectional" and insert -- bi-directional --.

Column 5, Line 38 (Approx.) Delete "$V_{Gt\text{-}Bank}$," and insert -- "$V_{Gt\text{-}Blank}$," --.

Column 7, Line 38, Delete "$V^{Iksense}$" and insert -- $V_{Iksense}$ --.

Column 7, Line 52, "$is$" and insert -- is --.

UNITED STATES PATENT AND TRADEMARK OFFICE
CERTIFICATE OF CORRECTION

PATENT NO. : 6,998,782 B1
APPLICATION NO. : 10/921499
DATED : February 14, 2006
INVENTOR(S) : Charles Guan It is certified that error appears in the above-identified patent and that said Letters Patent is hereby corrected as shown below:

Column 10, Line 2, Delete "Iout" and insert -- $I_{out}$ --.

Column 11, Line 33, (Approx.) Delete "e.g." and insert -- e.g.,--.

Column 11, Line 42, Delete "e.g." and insert -- e.g.,--.

Column 12, Line 12 (Approx.) Delete "e.g." and insert -- e.g.,--.

Column 12, Line 56 (Approx.) After "follows" delete "." and insert -- : --.

Column 13, Line 14, Delete "Vbias" and insert -- $V_{bias}$--.

Column 13, Line 49 (Approx.) Delete "Iest" and insert -- $I_{ext}$--.

Column 13, Line 50, Delete "Lin)" and insert -- $I_{in}$)--.

Column 14, Line 10, In Claim 1, insert --, -- before "wherein".

Column 15, Line 42, In Claim 11, after "wherein" delete "the".

Column 18, Line 4, In Claim 20, insert --, -- before "wherein".

Signed and Sealed this

Eighteenth Day of July, 2006

JON W. DUDAS
*Director of the United States Patent and Trademark Office*